United States Patent
Yan

(10) Patent No.: US 10,223,930 B2
(45) Date of Patent: Mar. 5, 2019

(54) ACTION DATA GENERATION DEVICE AND CLIENT AND SYSTEM FOR INFORMATION TRANSMISSION

(71) Applicant: Jian Yan, Beijing (CN)

(72) Inventor: Jian Yan, Beijing (CN)

( * ) Notice: Subject to any disclaimer, the term of this patent is extended or adjusted under 35 U.S.C. 154(b) by 207 days.

(21) Appl. No.: 15/186,136

(22) Filed: Jun. 17, 2016

(65) Prior Publication Data

US 2016/0300501 A1 Oct. 13, 2016
US 2018/0322797 A9 Nov. 8, 2018

Related U.S. Application Data

(63) Continuation-in-part of application No. PCT/CN2014/000168, filed on Feb. 20, 2014.

(30) Foreign Application Priority Data

Dec. 18, 2013 (CN) .......................... 2013 1 0694588

(51) Int. Cl.
G09B 5/10 (2006.01)
G09B 5/14 (2006.01)
G09B 5/06 (2006.01)

(52) U.S. Cl.
CPC ............. G09B 5/10 (2013.01); G09B 5/06 (2013.01); G09B 5/14 (2013.01)

(58) Field of Classification Search
None
See application file for complete search history.

(56) References Cited

U.S. PATENT DOCUMENTS

| | | | |
|---|---|---|---|
| 2006/0031291 A1* | 2/2006 | Beckemeyer | G06Q 10/10 709/204 |
| 2009/0325138 A1 | 12/2009 | Shuster | |
| 2010/0151431 A1* | 6/2010 | Miller | G09B 5/00 434/350 |
| 2012/0231441 A1* | 9/2012 | Parthasarathy | G09B 7/02 434/362 |

(Continued)

FOREIGN PATENT DOCUMENTS

| | | |
|---|---|---|
| CN | 159516 A | 3/2005 |
| CN | 103035137 A | 4/2013 |
| CN | 103198724 A | 7/2013 |

OTHER PUBLICATIONS

International Search Report for corresponding PCT/CN2014/000168, completed May 27, 2014 by Jushuang Yang.

*Primary Examiner* — Jason T Yen
(74) *Attorney, Agent, or Firm* — Tarolli, Sundheim, Covell & Tummino LLP

(57) ABSTRACT

The invention relates to an action data generation device, and a client and a system for information transmission, wherein the action data generation device comprises an action input unit and an action data generation unit, the action input unit is for receiving action information on an interface and sending the action information to the action data generation unit, and the action data generation unit is for receiving the action information input by the action input unit and generating action data including a path part and a data part according to the action information. The technical solution provided by the present invention realizes effective extraction of data from the interface and improves the data transmission efficiency.

5 Claims, 3 Drawing Sheets

(56) References Cited

U.S. PATENT DOCUMENTS

2014/0004496 A1* 1/2014 Reddy ................... G09B 7/02
  434/322
2014/0337734 A1* 11/2014 Bradford ............... G06Q 10/00
  715/719

* cited by examiner

ACTION DATA GENERATION DEVICE AND CLIENT AND SYSTEM FOR INFORMATION TRANSMISSION

RELATED APPLICATIONS

This application is a continuation-in-part of International Application Serial No. PCT/CN2014/000168, filed 20 Feb. 2014, which is incorporated herein in its entirety.

FIELD OF THE INVENTION

The present invention relates to a teacher-student interactive teaching method based on a panoramic learning system platform. A network-based virtual classroom is formed such that students in the same virtual classroom can synchronously watch all the explanation actions of a teacher or an authorized student on a virtual blackboard, and therefore, the purposes of panoramic real classroom simulating interactive teaching is achieved.

BACKGROUND OF THE INVENTION

With the development of the digital technology, more and more people learn the up-to-date knowledge from the Internet and online learning has become a brand-new way for people to enrich their own knowledge. At present, an online learning system mainly relies on two ways, i.e., video teaching or simple text teaching. Because such video recorded courses are non-interactive, only unidirectional information propagation is allowed during teaching. The distance between the recording location and the students in learning results in a non-interactive learning effect in the learning process, and thus students are not interested in courseware. Further, if the video file is too large, it may lead to unsmooth propagation at the peak of network transmission, which is especially obvious in remote areas and areas where network transmission quality is bad, and unfortunately, the teaching effect is affected seriously. However, the simple text teaching way is too dull and is thus even less suitable for primary and secondary students to use.

SUMMARY OF THE INVENTION

In a preferred embodiment of the present invention there is provided a teacher-student interactive teaching method based on a panoramic learning system platform.

In this embodiment, a teacher creates a virtual electronic blackboard in a central server by means of a panoramic learning system platform and puts data needed by lecturing into a database associated with the virtual electronic blackboard; a student utilizes a client of the panoramic learning system platform, logs in to the created virtual electronic blackboard via the central server with an own registered account and acquires the data put into the database by the teacher; the virtual electronic blackboard is displayed on computer terminals of the teacher and each student by means of the clients of the panoramic learning system platform, and the construction of a remote teaching virtual classroom thus is completed; during lecturing, the panoramic learning system platform acquires the voice and explanation actions on the virtual electronic blackboard of a teacher lecturing now, and then analyzes the explanation actions to form a binary data stream containing generation time of actions, action types, and physical paths and additional data of the actions for synchronous live broadcasting together with the voice; the clients all can synchronously watch the teaching process of the teacher at the same time; in the explanation process of the teacher, if a student asks a question, the name or account of the questioning student will be displayed on the client of the teacher; under the circumstance of being authorized by the teacher, the authorized student shares the virtual electronic blackboard with the teacher by means of the panoramic learning system platform, and each client may simultaneously acquire the voice, questioning action and questioning process of the current authorized student; and therefore, panoramic remote interactive teaching thus is realized.

The panoramic learning system platform establishes the virtual classroom and shares various types of data used by the teacher during lecturing to the students in the same classroom; the voice and explanation actions of the teacher or the authorized student (including blackboard-writing, teaching stick guiding, and inserting multimedia materials such as pictures and videos for simulating virtual experiments and the like) form a file for live broadcasting over the network and thus are presented to all the students in the same virtual classroom. The students in the same virtual classroom are able to synchronously watch various explanation actions of the teacher or the authorized student and hear real-time voice; and it completely simulates the interactive teaching process in a real class.

The panoramic learning system platform integrates the contents of lecturing and the interactive teaching process in a same client interface by means of a panoramic sharing technology, thereby achieving the interactive teaching process effect completely the same as in the real class; operations are conducted through software interface without the feel of distance brought by video recording, and the interface is friendly; the generated file has a size being only $\frac{1}{16}$-$\frac{1}{10}$ of that of a traditional video, and therefore, the fluency of remote teaching is greatly improved under the same network quality; and the above-mentioned problems occurring when a video conference system is applied to teaching are well solved.

Other features and advantages of the present invention will be discussed in subsequent description and partially become obvious from the description or are known by implementing the present invention. The objects and other advantages of the present invention may be achieved and obtained by means of structures specifically pointed out in the written description, claims and accompanying drawings.

BRIEF DESCRIPTION OF THE DRAWINGS

The accompanying drawings are merely used for the object of illustrating specific embodiments, rather than limiting the present invention; and the same reference signs represent the same components throughout the accompanying drawings.

DETAILED DESCRIPTION OF THE EMBODIMENTS

Below the preferred embodiments of the present invention will be described in detail in combination with the accompanying drawings, which form a part of the present application and are used for explaining the principle of the present invention together with the embodiments of the present invention.

Figure 1:
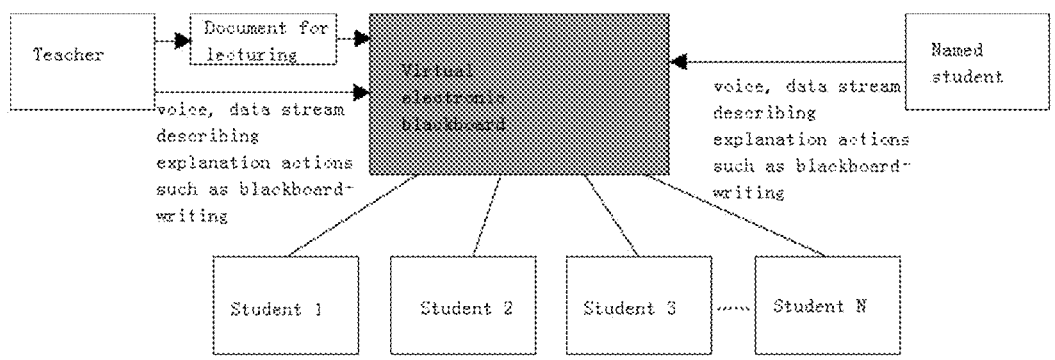
FIG. 1 is a schematic diagram of an interactive teaching implementation way provided according to a specific embodiment of the present invention.

FIG. 1 is the schematic diagram of the interactive teaching implementation way provided according to a specific embodiment of the present invention. A teacher creates a virtual electronic blackboard in a central server by means of a panoramic learning system platform and performs the operations of various explanation actions on the electronic blackboard, such that students in the same virtual classroom, by means of the clients of the panoramic learning system platform, all can synchronously hear the explanation voices of and watch the explanation processes of the teacher and/or an authorized student at the same time.

Figure 2:
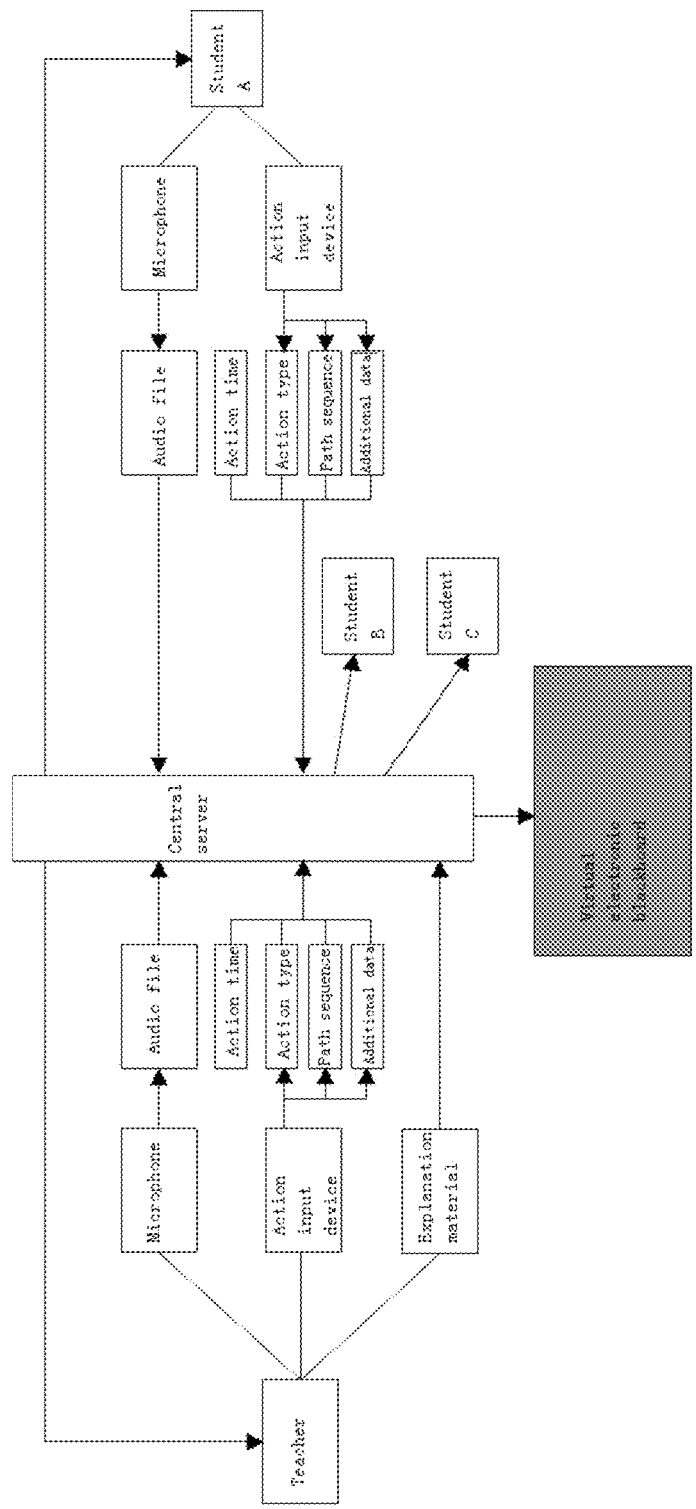
FIG. 2 is a schematic diagram of an interactive teaching implementation principle provided according to a specific embodiment of the present invention.

FIG. 2 is the schematic diagram of the interactive teaching implementation principle provided according to a specific embodiment of the present invention. A teacher creates a virtual electronic blackboard in a central server by means of a panoramic learning system platform and puts data needed by lecturing into a database associated with the virtual electronic blackboard; during lecturing, the system acquires, by means of a microphone, the explanation voice of the teacher or a student authorized to speak, and broadcasts it lively in the form of a streaming media file; meanwhile, the system acquires corresponding explanation actions by means of action input devices (e.g., a mouse, an electronic whiteboard, a handwriting pen, a keyboard and the like), processes a sequence of generation time of actions, action types and relevant paths of the actions and additional data of the actions into a binary data stream, and distributes the binary data stream describing the explanation actions to student clients, and in this way, the live conditions of the class are transmitted completely in combination with the lively broadcasted voice. In order to save the bandwidth of the server end, the distribution of the data also can be implemented among students (in the form of P2P communication). To realize the same interaction process as a real class, the virtual classroom must be established, various types of data used by the teacher during lecturing can be shared to students in the same classroom, and finally, the voice and the explanation actions and process of the teacher or the authorized student must be lively broadcasted over a network and presented to all the students in the same classroom.

The formation process of the binary data stream is as follows: the panoramic learning system platform acquires the real-time voice of the teacher or the authorized student by means of the microphone, and meanwhile, acquires the actions of the teacher or an interacting student on the current system interface by means of the mouse, keyboard, writing pad or electronic whiteboard and performs data analysis on the actions to acquire the generation time of the actions, the generation paths of the actions, the additional data carried by the actions and action type data, all of which are recorded in a time sequence, wherein the actions are classified as a handwriting type, a media type and a data type. Each of the handwriting type, media type and data type data includes two parts: a path part and a data part. For a handwriting type action, the path part thereof completely records a physical coordinate sequence of the action path, while the data part thereof is disenabled; for a media type action, the path part thereof records coordinates of a multimedia file appearing in courseware, while the data part thereof records a physical address of the multimedia file; and for a data type action, the path part thereof records coordinates of the data used in the courseware, while the data part thereof is written in the complete binary data stream of the file. The additional data includes pictures, multimedia, text content, binary content and the like.

FIG. 2 provides the specific embodiment in which the present invention is applied to a classroom. The technical solution of the present invention can be directly applied to similar application scenes, e.g., a technical seminar of a technical team working in multiple places, or a real-time seminar of which participants are distributed in multiple places. The panoramic learning platform mentioned in the present embodiment refers to that information of a classroom can be comprehensively displayed on a screen of any participant, unlike the prior art in which only voice and/or handwritings are transmitted. The panoramic learning platform in the prior art generally employs a video recording manner, which has the problems of too large size of real-time generated data, high requirement on network transmission conditions, interface information not displayed directly and the like.

Figure 3:
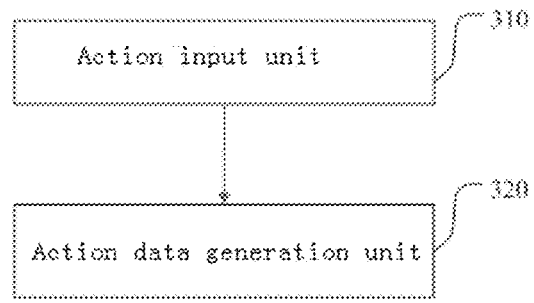
FIG. 3 is a structural schematic diagram of an action data generation device provided according to a specific embodiment of the present invention.

For extraction of the action data, it will be described in combination with FIG. 3. FIG. 3 is a structural schematic diagram of the action data generation device provided according to a specific embodiment of the present invention. The action data generation device in FIG. 3 comprises an action input unit 310 and an action data generation unit 320.

The action input unit 310 is used for receiving action information on an interface and sending the action information to the action data generation unit.

The interface may be any carrier, from which the action information can be extracted, including but not limited to a white board, a blackboard, a computer display screen, a cellphone display screen, a mouse, a keyboard or the like.

In the specific embodiment of the present invention, the action information includes, but not limited to, handwriting type action information, media type action information and data type action information.

The handwriting type action information is featured by the change of physical coordinates of an interface contact point, for example, writing on the blackboard, a motion track of the mouse and the like. For the handwriting type action information, the action input unit 310 extracts a physical coordinate change sequence of the handwriting actions.

The media type action information includes, but is not limited to, media files to be displayed, such as multimedia files, animations, experiments, demonstration videos and the like. When the action input unit 310 identifies the action information on the interface as the media type action information, the action input unit 310 acquires coordinates of a media file on the interface and a physical address of the media file.

Before a lesson or discussion, all participants are able to acquire data related to the lesson or the discussion, which may be saved in any location on the network or in a database. There may be a variety of ways for the participants to acquire data. For example, they may be informed of downloading data from a certain network address or acquiring data from a certain database.

With regard to the coordinates of the media file on the interface, for example, when a certain media file is displayed at the top left corner or at the top right corner of the interface, the coordinates of the media file on the interface are also sent out as information so as to truly and comprehensively reflect the interface information.

With regard to the physical address of the media file, the media file may be acquired according to the physical address of the media file.

The data type action information refers to data information converted from software, a file or the like on the interface. For example, a word document may be converted into binary data for transmission.

When the action input unit 310 identifies the action information on the interface as the data type action information, the action input unit 310 acquires coordinates of the action on the interface and binary data to be transferred.

For example, the action relates to a word document that is represented by an icon on the interface, and then the position of the icon may be regarded as the position of the action.

As for information neither being the handwriting type action information nor included in data acquired in advance, the action input unit 310 identifies and saves the information as additional data, which may include pictures, multimedia, text content, binary content and the like.

The action data generation unit 320 is used for receiving the action information input by the action input unit and generating action data including a path part and a data part according to the action information.

The action data generation unit 320 also comprises an action type judgment unit (not shown in the figure) that is used for judging the type of the action information. The action data generation unit generates the action data according to the type.

Specifically, when the action information is of the handwriting type, the path part of the action data comprises a physical coordinate sequence of handwriting. When the action information is of the media type, the path part of the action data comprises coordinates of a media file on the interface, while the data part of the action data comprises a physical address of the media file. When the action information is of the data type, the path part of the action data comprises coordinates of an action on the interface, while the data part of the action data comprises binary data to be transferred.

Figure 4:
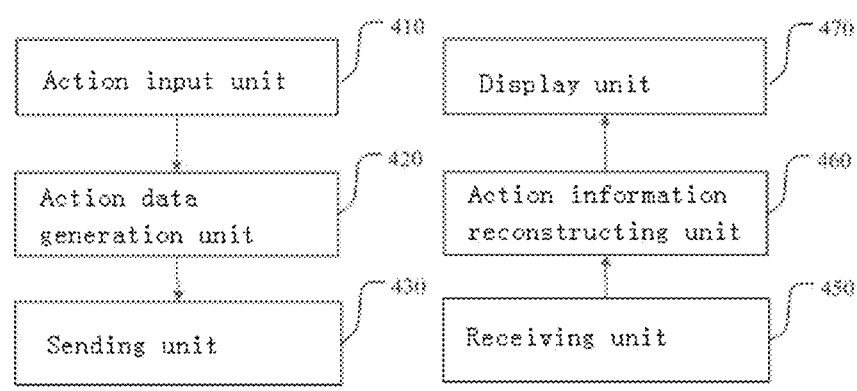
FIG. 4 is a structural schematic diagram of a client for information transmission provided according to a specific embodiment of the present invention.

FIG. 4 is a structural schematic diagram of the client for information transmission provided according to a specific embodiment of the present invention. The client comprises an action input unit 410, an action data generation unit 420, a sending unit 430, a receiving unit 450, an action information reconstructing unit 460 and a display unit 470.

When the client operates in an information sending mode, the action input unit 410, the action data generation unit 420 and the sending unit 430 are activated. When the client operates in an information receiving mode, the receiving unit 450, the action information reconstructing unit 460 and the display unit 470 are activated.

The action input unit 410 is used for receiving action information on an interface and sending the action information to the action data generation unit.

The interface may be any carrier, from which the action information can be extracted, including but not limited to a white board, a blackboard, a computer display screen, a cellphone display screen, a mouse, a keyboard or the like.

In the specific embodiment of the present invention, the action information includes, but not limited to, handwriting type action information, media type action information and data type action information.

The handwriting type action information is featured by the change of physical coordinates of an interface contact point, for example, writing on the blackboard, a motion track of the mouse and the like. For the handwriting type action information, the action input unit 410 extracts a physical coordinate change sequence of the handwriting actions.

The media type action information includes, but not limited to, media files to be displayed, such as multimedia files, animations, experiments, demonstration videos or the like. When the action input unit 410 identifies the action information on the interface as the media type action information, the action input unit 410 acquires coordinates of a media file on the interface and a physical address of the media file.

Before a lesson or discussion, all participants are able to acquire data related to the lesson or the discussion, which may be saved in any location on the network or in a database. There may be a variety of ways for the participants to acquire data. For example, they may be informed of downloading data from a certain network address or acquiring data from a certain database.

With regard to the coordinates of the media file on the interface, for example, when a certain media file is displayed at the top left corner or at the top right corner of the interface, the coordinates of the media file on the interface are also sent out as information so as to truly and comprehensively reflect the interface information.

With regard to the physical address of the media file, the media file may be acquired according to the physical address of the media file.

The data type action information refers to data information converted from software, a file or the like. For example, a word document may be converted into binary data for transmission.

When the action input unit 410 identifies the action information on the interface as the data type action information, the action input unit 410 acquires coordinates of the action on the interface and binary data to be transferred.

For example, the action relates to a word document that is represented by an icon on the interface, and then the position of the icon may be regarded as the position of the action.

As for information neither being the handwriting type action information nor included in data acquired in advance, the action input unit 410 identifies and saves the information as additional data which may include pictures, multimedia, text content, binary content and the like.

The action data generation unit 420 is used for receiving the action information input by the action input unit and generating action data including a path part and a data part according to the action information.

The action data generation unit 420 also comprises an action type judgment unit (not shown in the figure) that is used for judging the type of the action information. The action data generation unit generates the action data according to the type.

Specifically, when the action information is of the handwriting type, the path part of the action data comprises a physical coordinate sequence of handwriting. When the action information is of the media type, the path part of the action data comprises coordinates of a media file on the interface, while the data part of the action data comprises a physical address of the media file. When the action information is of the data type, the path part of the action data comprises coordinates of an action on the interface, while the data part of the action data comprises binary data to be transferred.

The sending unit 430 is used for sending the action data generated by the action data generation unit. The sending unit may be any unit capable of sending data information. The sending unit 430 is also used for sending the additional data when the action input unit 410 acquires the additional data. Besides, the sending unit 430 also is used for sending audio data generated by the present client.

The client further comprises a mode switching unit (not shown in the figure) for switching the client between a controlling mode and a controlled mode. The controlling mode refers to a mode operating to control the present client and other clients to be in an information receiving mode or an information sending mode, for example, a teacher in a lecturing scene and a presenter of a symposium. The controlled mode refers to a mode in which the present client is controlled by the client operating in the controlling mode to be in the information receiving mode or the information sending mode.

The controlling mode and the controlled mode may be set or switched at the beginning of a lesson or a meeting, or may be switched as required during the lesson or the meeting. Generally, when a lesson begins, the operating modes of the teacher operating in the controlling mode and students operating in the controlled mode can be determined, while in some special occasions, the operating modes can be switched to allow a student to control the classroom in the middle of the lesson.

The client operating in the controlling mode generally is in the information sending mode, wherein the action data thereof is sent to other clients, and so is the audio data thereof. The action data and the audio data are associated with each other according to respective time information contained therein. The client operating in the controlling mode may control certain client to be in the information sending mode according to a trigger condition, and in this case, the client operating in the controlling mode and the remaining clients all are in the information receiving mode. The trigger condition may be direct authorization of the client operating in the controlling mode, for example, when the teacher calls a student to answer a question, or authorization of the client operating in the controlling mode after a client makes a request, for example, when a student wants to speak and the teacher agrees and authorizes the sending mode to the student.

When the client operates in the information receiving mode, the receiving unit 450, the action information reconstructing unit 460 and the display unit 470 are activated.

The receiving unit 450 is used for receiving the action data. The receiving unit 450 is also used for receiving additional data when information sent by other client contains the additional information. The receiving unit 450 is also capable of receiving audio data that is synchronized with the action information, which is reconstructed by the action information reconstructing unit 460, by means of the carried time information.

The action information reconstructing unit 460 is used for reconstructing the action information for interface display based on the action data received by the receiving unit.

Each of different types of action data includes a path part and a data part. However, the different types of action data are slightly different in information born by the path parts and the data parts, and therefore, according to the features of the born information, the type of the action data received can be judged.

When the action information is of the handwriting type, the physical coordinate sequence of the handwriting of the path part of the action data is extracted and reconstructed into the motion track of the handwriting.

When the action information is of the media type, the coordinates of a media file on the interface in the path part of the action data and a physical address of the media file included in the data part are extracted. After the media file is extracted from the physical address, the display position thereof on the interface is determined according to the coordinates thereof on the interface.

When the action information is of the data type, the coordinates of data on the interface included in the path part of the action data and data information included in the data part are extracted.

Corresponding contents can be converted from the data information and the position of the contents displayed on the interface can be determined according to the coordinates on the interface.

The display unit 470 is used for displaying the action information reconstructed by the action information reconstructing unit 460.

A specific embodiment of the present invention also provides a system for information transmission. The system includes a plurality of clients provided according to the present invention, wherein at least one client operates in a controlling mode, and at least one client operates in a controlled mode. Generally, only one client in the system operates in the controlling mode, but in some special application scenes, there may be a plurality of clients operating in the controlling mode that may implement control to the system and other clients in such manners as time sharing, negotiation, requisition and the like.

The clients operating in the controlled mode generally operate in an information receiving mode, reconstruct action information according to the received information, and realize the synchronization of the action information and audio information according to time information carried in the action information and the audio information. After being authorized by the client operating in the controlling mode, the clients operating in the controlled mode activate the action input units, the action data generation units and the sending units so as to operate in an information sending mode.

In consideration of information security and information acquisition convenience, the system for information transmission may also include a database. The client operating in the controlling mode manages the database, for example, uploading data, modifying data, encrypting data, setting the identity of customers downloading data and the like. The clients operating in the controlled mode, within the limits of authority thereof, are able to download data from the database.

In conclusion, the teacher-student interactive teaching method based on the panoramic learning system platform, the action data generation device, the client for information transmission and the system for information transmission provided according to the embodiments of the present invention overcome the defects of the prior art, such as too large transmission amount of video recording data, and no visual data of screens (e.g., a blackboard, a white board and the like), or transmission of only handwriting data and missing lots of classroom information or information similar to classroom, or the like. As a result, the information transmission efficiency is greatly improved.

The functions described herein may be implemented in hardware, software executed by processor, firmware or any combination thereof. If the functions are implemented in the software executed by processor, they may be, as one or more commands or codes, stored on a computer readable media or transmitted via the computer readable media. Other examples and embodiments fall within the scope and spirit of the present invention and the attached claims. For example, due to the properties of software, the above-described functions may be implemented by software executed by processor, hardware, firmware, hard wiring or any combination thereof. The features of the implemented functions may also be physically located in various positions, including that part of the functions is implemented in different physical positions via distribution. Additionally, as used herein (including in claims), "or", when used in an item list with term "at least one of", indicates a separate list, enabling (for example) the list of "at least one of A. B or C" means A or B or C or AB or AC or BC or ABC (i.e., A and B and C).

Either of a computer program product and the computer readable media includes a computer readable storage media and a communication media, including any media promoting the transmission of a computer program from one place to another place. The storage media may be any available media accessible by a general-purpose computer or special-purpose computer. For example but without limitation, the computer readable media may include RAM, ROM, EEPROM, CD-ROM or any other optical disk storage device, a magnetic disk storage device or any other magnetic storage device, or a device capable of carrying or storing desired program codes in the form of a command or a data structure, and any other media accessible by a general-purpose computer or special-purpose computer or a general-purpose computer or special-purpose processor. In addition, any connection may be referred to as the computer readable media when appropriate. For example, if utilizing a coaxial cable, an optical fiber cable, a twisted pair, a digital subscriber line (DSL), or a wireless technology, such as infrared, radio, microwave or the like, to emit software from a website, a server or other remote light source, the coaxial cable, the optical fiber cable, the twisted pair, the DSL, or the wireless technologies, for example, infrared, radio, microwave and the like all are included in the definition of the computer readable media. As used herein, the magnetic disk and the optical disk include compact disks (CD), laser disks, optical disks, digital video disks (DVD), soft disks and blue-ray disks, wherein the magnetic disk generally reproduces data in a magnetic way, while the optical disk reproduces data by means of laser in an optical way. The combinations of all the above also fall within the scope of the computer readable media.

What we claim is:

1. A system for information transmission, comprising a plurality of clients for information transmission, each client comprising:
   an action input unit for receiving action information on an interface and sending the action information to an action data generation unit;
   the action data generation unit, for receiving action information input by the action input unit and generating action data according to the action information, wherein action data includes a path part and a data part, wherein, for each instance of action information received from the action input unit, the path part consists of coordinates of a contact point on the interface or a physical coordinate change sequence of an action path on the interface characterizing a change of physical coordinates of a contact points on the interface, and the data part consist of a file path, binary file data, or no data;
   a sending unit for sending separately the path part and the data part of the action data generated by the action data generation unit to any other client in the system;
   a receiving unit for receiving action data from any other client in the system;
   an action information reconstructing unit for reconstructing, from the received action data, action information for display on the interface based on the action data received by the receiving unit; and
   a display unit for displaying the action information reconstructed by the action information reconstructing unit,
   wherein at least one client operates in a controlling mode, and at least one client operates in a controlled mode; and wherein the client operating in the controlled mode, after being authorized by the client operating in the controlling mode, activates the action input unit, the action data generation unit and the sending unit of the client operating in the controlled mode.

2. The system according to claim 1, wherein each instance of action information, whether received from the action input unit or reconstructed by the action information reconstructing unit, is of one of three types: a handwriting type, a media type, or a data type.

3. The system according to claim 2, wherein each instance of action information comprises one of:
   a physical coordinate sequence of handwriting, based on the action information being of the handwriting type;
   coordinates of a media file on the interface and a physical address of the media file, based on the action information being of the handwriting type; and/or
   coordinates of an action on the interface and binary data to be transferred, based on the action information being of the data type.

4. The system according to claim 1, wherein the system is a remote teaching system.

5. The system according to claim 4, wherein the remote teaching system is a panoramic learning system platform comprises:
   a teacher client configured to allow a teacher to create a virtual electronic blackboard in a central server in part by putting data needed for lecturing into a database associated with the virtual electronic blackboard;
   one or more student clients each configured to be used by one of one or more students in part by logging in to the created virtual electronic blackboard via the central server with a registered account and acquiring the data put into the database by the teacher;
   wherein the virtual electronic blackboard is configured to be displayed on computer terminals of both the teacher and each of the one or more students using the teacher client and the one or more student clients of the panoramic learning system platform;
   wherein the panoramic learning system platform is further configured to acquire, during a lecture session, voice and explanation actions on the virtual electronic blackboard of the teacher lecturing, and to analyze the explanation actions to form a binary data stream containing generation time of actions, action types, and physical paths, and containing additional data of the actions for synchronous live broadcasting together with the voice;
   wherein the student clients are further configured to synchronously display the teaching process of the teacher and to permit input of student questions during the explanation process of the teacher;
   wherein the teacher client is further configured to display the name or account of a questioning student based on input of a student, question to a student client and to permit the teacher to authorize sharing control of the virtual electronic blackboard with the questioning student; and wherein the student clients are further configured to simultaneously acquire the voice, questioning action and questioning process of a currently authorized student.

* * * * *